(12) United States Patent
Tani (10) Patent No.: US 8,941,732 B2
(45) Date of Patent: Jan. 27, 2015

(54) THREE-DIMENSIONAL MEASURING METHOD

(75) Inventor: Kota Tani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 13/540,811

(22) Filed: Jul. 3, 2012

(65) Prior Publication Data

US 2013/0021449 A1    Jan. 24, 2013

(30) Foreign Application Priority Data

Jul. 22, 2011    (JP) ................................. 2011-160959

(51) Int. Cl.
*H04N 13/02* (2006.01)
*G06T 7/00* (2006.01)
*G01B 11/00* (2006.01)
*H04N 13/00* (2006.01)

(52) U.S. Cl.
CPC ............ *G06T 7/0046* (2013.01); *G01B 11/002* (2013.01); *H04N 13/0239* (2013.01); *H04N 2013/0081* (2013.01); *G06T 2207/10012* (2013.01); *G06T 2207/30164* (2013.01)
USPC ............................................. 348/135; 348/47

(58) Field of Classification Search
USPC ..................................................... 348/47, 135
See application file for complete search history.

(56) References Cited

U.S. PATENT DOCUMENTS

2012/0249751 A1* 10/2012 Zhang et al. .................... 348/47

FOREIGN PATENT DOCUMENTS

JP            05-005609 A       1/1993

* cited by examiner

*Primary Examiner* — Sath V Perungavoor
*Assistant Examiner* — Jeffrey Williams
(74) *Attorney, Agent, or Firm* — Fitzpatrick, Cella, Harper & Scinto (57) ABSTRACT

Provided is a three-dimensional measuring method that can select a large number of line sections for calculating formulas of three-dimensional lines to perform three-dimensional measurement of a measurement object.

4 Claims, 7 Drawing Sheets

FIG. 7

THREE-DIMENSIONAL MEASURING METHOD

BACKGROUND OF THE INVENTION

1. Field of the Invention

The present invention relates to a three-dimensional measuring method of measuring a three-dimensional position or pose of a measurement object, and particularly, to a three-dimensional measuring method of using images taken by cameras to measure a three-dimensional position or pose of a measurement object.

2. Description of the Related Art

In general, a method called a stereo method is widely known as a method of imaging a measurement object by cameras to obtain coordinates of a three-dimensional point of the measurement object from taken images. The stereo method is a method of using parallax of cameras to measure a three-dimensional position. The method obtains a corresponding point of a point for measuring the three-dimensional position, on the images taken by two cameras with different viewpoints. The three-dimensional position is calculated by a principle of triangulation based on the corresponding points on the images and based on a known positional relationship between the cameras.

The stereo method is widely utilized in a three-dimensional measurement technique used in production inspection and used by an industrial robot to recognize the measurement object. For example, the stereo method is used to calculate a formula of a three-dimensional line of a line section, such as a straight edge section of the measurement object.

More specifically, if design data of the measurement object is known, the three-dimensional position of the measurement object can be obtained from the design data when the pose of the measurement object is determined by calculating the formulas of the three-dimensional lines of two or more parts of the line sections, such as straight edge sections of the measurement object. Three-dimensional positions of two or more points on the line sections are generally used to calculate the formulas of the three-dimensional lines of the line sections. The stereo method is used to calculate the positions of the points on the line sections.

However, unlike in the calculation of the three-dimensional position of a point-like object, it is difficult to specify a point on a line section of the image taken by the other camera corresponding to a point on a line section of the image taken by one of the cameras.

To detect the corresponding points of the line sections on the image planes, the use of a virtual reference line called an epipolar line is known. The epipolar line is obtained by projecting a line of sight from one of the cameras to an object (for example, a point on a line section of the measurement object) to the image taken by the other camera. It can be stated that the corresponding point to be obtained is on the epipolar line. Therefore, to specify a point on the other image corresponding to a point on the line section on the one of the images, the epipolar line can be drawn on the other image, and an intersection point of the epipolar line and the line section of the other image can be determined as the corresponding point.

However, the epipolar line is projected on image planes as a line where a plane (epipolar plane), which includes the viewpoints of the two cameras and a point of the measurement object, intersects the image planes of the two cameras. Therefore, the slope is unambiguously determined based on the positional relationship between the two cameras. As a result, the epipolar line and the line section overlap in the line section where the slope is parallel to the epipolar line, and the corresponding point cannot be specified.

If the relative angle between the epipolar line and the line section is close to parallel on the image, a detection error of the corresponding point in relation to an error in the detection of the line section on the image exerts a significant influence, and the measurement accuracy may be reduced.

Conventionally, proposed is using an operator for extracting a line section where the relative angle with respect to the epipolar line is close to a right angle to extract only a line section with an enough relative angle with respect to the epipolar line (see Japanese Patent Application Laid-Open No. H05-005609).

SUMMARY OF THE INVENTION

The corresponding points between images can be accurately obtained by using the operator to extract the line section where the relative angle with respect to the epipolar line is close to the right angle as in Japanese Patent Application Laid-Open No. H05-005609.

However, if the operator is used, an arbitrary line section on the measurement object cannot be selected. Two or more line sections may not be able to be extracted depending on the shape of the measurement object or the setting of the operator, and the three-dimensional position and pose of the measurement object may not be able to be obtained.

An object of the present invention is to provide a three-dimensional measuring method that can select more line sections in the selection of line sections for calculating formulas of three-dimensional lines to perform three-dimensional measurement of a measurement object.

The present invention provides a three-dimensional measuring method including the steps of: obtaining design data of a measurement object; obtaining a first image of the measurement object taken by a first camera and a second image of the measurement object taken by a second camera from a viewpoint different from the first image; detecting a plurality of line sections of the measurement object from the first and second images and selecting at least a first line section and a second line section from the plurality of line sections; using a stereo method to calculate a formula of a three-dimensional line of the first line section; using the formula of the three-dimensional line of the first line section and a geometric constraint condition for the first line section obtained from the design data of the measurement object to calculate a formula of a three-dimensional line of the second line section; and using the formulas of the three-dimensional lines of the first and second line sections to measure a three-dimensional position or pose of the measurement object.

According to the present invention, the stereo method is used to calculate the three-dimensional positions of two points on the first line section to obtain the formula of the three-dimensional line of the first line section as a reference. The calculated formula of the line of the first line section and the geometric constraint condition for the first line section obtained from the design data of the measurement object are used to calculate the formula of the three-dimensional line of the second line section. Therefore, even if the relative angle of a line section with respect to the epipolar line is parallel, the line section can be selected as the second line section. As a result, a large number of line sections can be selected in the selection of the line sections for calculating the formulas of the three-dimensional lines.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

<Structure of Three-Dimensional Measuring Apparatus>

A three-dimensional measuring method according to an embodiment of the present invention will now be described with reference to FIGS. 1 to 7. In the following description, a character L will be used to describe an actual line section of a measurement object W, and a character Le will be used to describe a line section of the measurement object detected by a three-dimensional measuring apparatus 1 from image data. A line section detected by the three-dimensional measuring apparatus 1 on a first image F1 will be designated with Le-1, and a line section detected on a second image will be designated with Le-2. More specifically, L1 denotes a first line section of the actual measurement object W, Le1 denotes a first line section detected by the three-dimensional measuring apparatus 1 from image data, and Le1-1 denotes a first line section on the first image F1.

Figure 1:
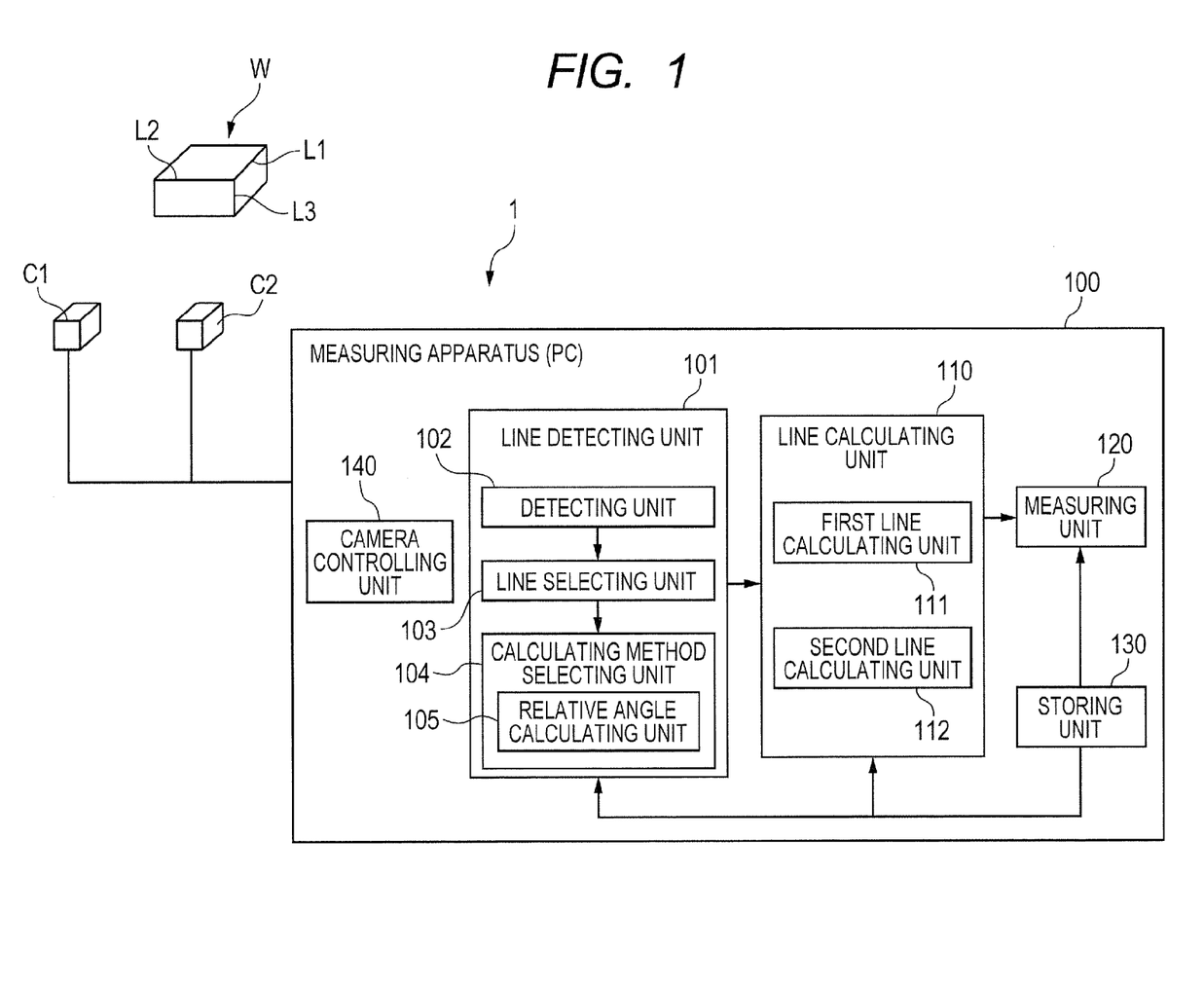
FIG. 1 is a schematic diagram illustrating a three-dimensional measuring apparatus according to an embodiment of the present invention.

A structure of the three-dimensional measuring apparatus 1 according to the present embodiment will be described with reference to FIGS. 1 and 2. The three-dimensional measuring apparatus 1 includes a first camera C1, a second camera C2, and a measuring apparatus 100 connected with the pair of cameras C1 and C2. Camera parameters as well as a relative position of the first camera C1 and the second camera C2 are calibrated. Optical axes of the first camera C1 and the second camera C2 are on the same horizontal plane, and the optical axes are parallel.

The measuring apparatus 100 includes a PC or the like that performs imaging processing and computations based on images F1 and F2 taken by the first and second cameras C1 and C2. The measuring apparatus 100 includes: a camera controlling unit 140 that controls the first and second cameras C1 and C2; and a storing unit 130 that stores design data of the measurement object W imaged by the first and second cameras C1 and C2. The measuring apparatus 100 further includes a line detecting unit 101, a line calculating unit 110, and a measuring unit 120.

The line detecting unit 101 detects a plurality of straight edges (hereinafter, "line sections") L1, L2, L3 . . . from the edges (contours) of the measurement object W and selects at least two line sections L1 and L2 from the plurality of detected line sections. More specifically, the line detecting unit 101 includes a detecting unit 102, a line selecting unit 103, and a calculating method selecting unit 104. The detecting unit 102 detects the line sections L1, L2, L3 . . . of the measurement object W from the image data of the first image F1 of the measurement object W taken by the first camera C1 and the second image F2 of the measurement object W taken by the second camera C2 from a different viewpoint from the first image F1. The line selecting unit 103 selects at least two line sections Le1 and Le2 from a plurality of line sections Le1, Le2, Le3 . . . detected by the detecting unit 102. The calculating method selecting unit 104 selects calculating methods of formulas of three-dimensional lines of the line sections Le1 and Le2 selected by the line selecting unit 103.

The line calculating unit 110 calculates the formulas of the lines of the line sections Le1 and Le2 according to the calculating method of the formulas of the lines selected by the calculating method selecting unit 104. Specifically, the line calculating unit 110 includes a first line calculating unit 111 that uses the stereo method to calculate the formula of the three-dimensional line of the line section Le1. The line calculating unit 110 also includes a second line calculating unit 112 that uses the formula of the line of the line section L1, which is calculated by the first line calculating unit 111, and a geometric constraint condition for the line selection L1, which is obtained from the design data of the measurement object W, to calculate a formula of the three-dimensional line of the line section L2.

The measuring unit 120 uses the formulas of the three-dimensional lines of at least two line sections L1 and L2 calculated by the line calculating unit 110 to measure a three-dimensional position or pose of the measurement object W.

<Three-Dimensional Measuring Method>

How the three-dimensional measuring apparatus 1 measures the three-dimensional position or pose of the measurement object W will be described based on FIGS. 3 and 4 and with reference to FIGS. 1 and 2. As illustrated in FIG. 4, in the three-dimensional measurement of the measurement object W, the three-dimensional measuring apparatus 1 obtains the design data of the measurement object W and loads the design data to the storing unit 130 (S1 of FIG. 4, data obtaining step).

The three-dimensional measurement of the measurement object W is started when the load of the design data is finished (S2). The first camera C1 and the second camera C2 image the measurement object W according to an instruction from the camera controlling unit 140. The first image F1 of the measurement object W taken by the first camera C1 and the second image F2 of the measurement object W taken by the second camera C2 from a different viewpoint from the first image F1 are obtained (S3, imaging step).

Figure 2:
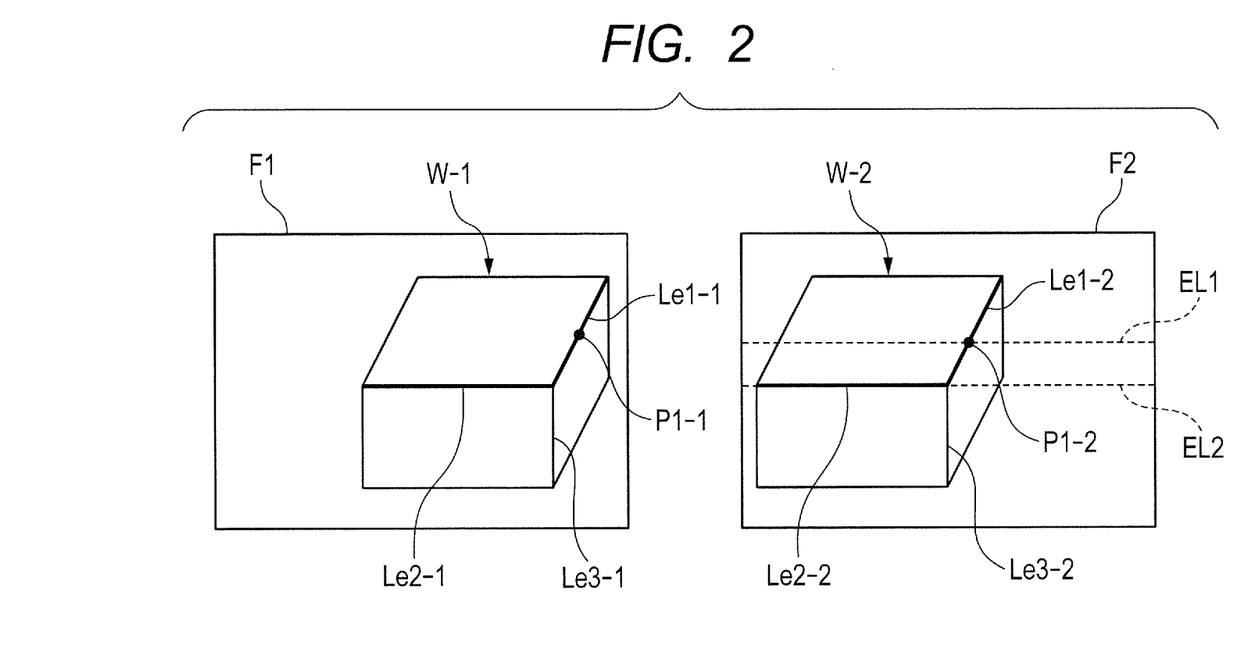
FIG. 2 is a schematic diagram illustrating images of a measurement object taken by first and second cameras of the three-dimensional measuring apparatus of FIG. 1.

When the image data of the first image F1 and the second image F2 illustrated in FIG. 2 is obtained, the line detecting unit 101 detects the plurality of line sections L1, L2, L3 . . . from two-dimensional data of the first and second images F1 and F2 (line section detecting step of S4). Specifically, when the first and second images F1 and F2 are loaded, the detecting unit 102 of the line detecting unit 101 detects line sections Le1-1, Le2-1, and Le3-1 of the measurement object W on the first image F1. The detecting unit 102 also detects line sections Le1-2, Le2-2, and Le3-2 of the measurement object W on the second image F2. The line sections Le1-1, Le1-2 . . . detected from the first and second images F1 and F2 are associated, and the line sections Le1-1, Le1-2 . . . are associated with the design data to determine to which of the line sections L on the actual measurement object the detected line sections Le correspond (detecting step of S4).

When the detected line sections Le and the line sections L of the actual measurement object W are associated, the line selecting unit 103 selects, from the detected line sections, the first line section L1 and the section line section L2 set in advance as the line sections for calculating the formulas of the three-dimensional lines (line section selecting step of S4). When the first line section Le1 and the second line section Le2 are selected, the calculating method selecting unit 104 sets to calculate the formula of the line of the first line section Le1 using the stereo method based on the setting by the operator. The calculating method selecting unit 104 also sets to calculate the formula of the line of the second line section Le2 using the design data (calculating method setting step of S4).

When the line sections Le1 and Le2 for calculating the formulas of the three-dimensional lines are selected, the first line calculating unit 111 uses the stereo method to calculate the formula of the three-dimensional line of the first line section (reference edge) Le1 that serves as a reference (S5, first line section calculating step). Specifically, the first line calculating unit 111 uses the stereo method to calculate the three-dimensional positions of two points on the first line section L1.

More specifically, assuming that image coordinates of a point P1-1 on the first line section Le1-1 of the first image F1 is $(u_{1b1}, v_{1b1})$ as illustrated in FIG. 2, the corresponding point of the point P1-1 (the same point on the measurement object) in the second image F2 is an intersection point P1-2 of an epipolar line EL1 corresponding to the point and the first line section Le1-2 on the second image F2.

As described, the optical axes of the first camera C1 and the second camera C2 are on the same horizontal plane, and the optical axes are parallel. Therefore, the slopes of the epipolar lines EL1 and EL2 are parallel to the row direction on the image.

Therefore, assuming that the image coordinates of the corresponding point P1-2 on the second image F2 are $(u_{1b2}, v_{1b1})$, the following Expression (1) can be derived.

$$v_{1b1} = v_{1b2} \quad (1)$$

Therefore, the corresponding point $(u_{1b2}, v_{1b2})$ is a point in which the column coordinate is $V_{1b1}$ on the first line section.

The first line calculating unit 111 uses the image coordinates on the two images indicating the same point on the three-dimensional space, the calibrated camera parameters, and the relative position of the two cameras to calculate the position coordinates $(x_{1b}, y_{1b}, z_{1b})$ of the point based on the stereo method. Similarly, the first line calculating unit 111 calculates the position coordinates $(x_{2b}, y_{2b}, z_{2b})$ of another point on the first line section to calculate the formula of the three-dimensional line of the first line section L1 based on the position coordinates of the two points on the first line section.

When the formula of the three-dimensional line of the first line section L1 is calculated, the second line calculating unit 112 calculates the formula of the three-dimensional line of the second line section L2 (S6, second line section calculating step). Specifically, the second line section L2 extends parallel to the epipolar line EL2 in the second image F2 of FIG. 2, and the corresponding point on the line cannot be specified between the first image F1 and the second image F2. Therefore, the second line calculating unit 112 uses the geometric constraint condition for the first line section L1 obtained from the design data (shape data) of the measurement object W stored in the storing unit 130 to calculate the formula of the three-dimensional line of the second line section L2. In the present embodiment, the geometric constraint condition is that the first line section L1 and the second line section L2 form a right angle.

When the formulas of the lines of the first line section L1 and the second line section L2 are calculated, the measuring unit 120 uses the formulas of the three-dimensional lines of the first and second line sections L1 and L2 as well as the design data to measure the three-dimensional position or pose of the measurement object (S7, measuring step) and ends the process (S8). Although the design data is also used here to measure the three-dimensional position or pose, the design data does not have to be used to measure the amount of deviation of the measurement object from a reference image. Therefore, the design data may not be used.

Figure 3:
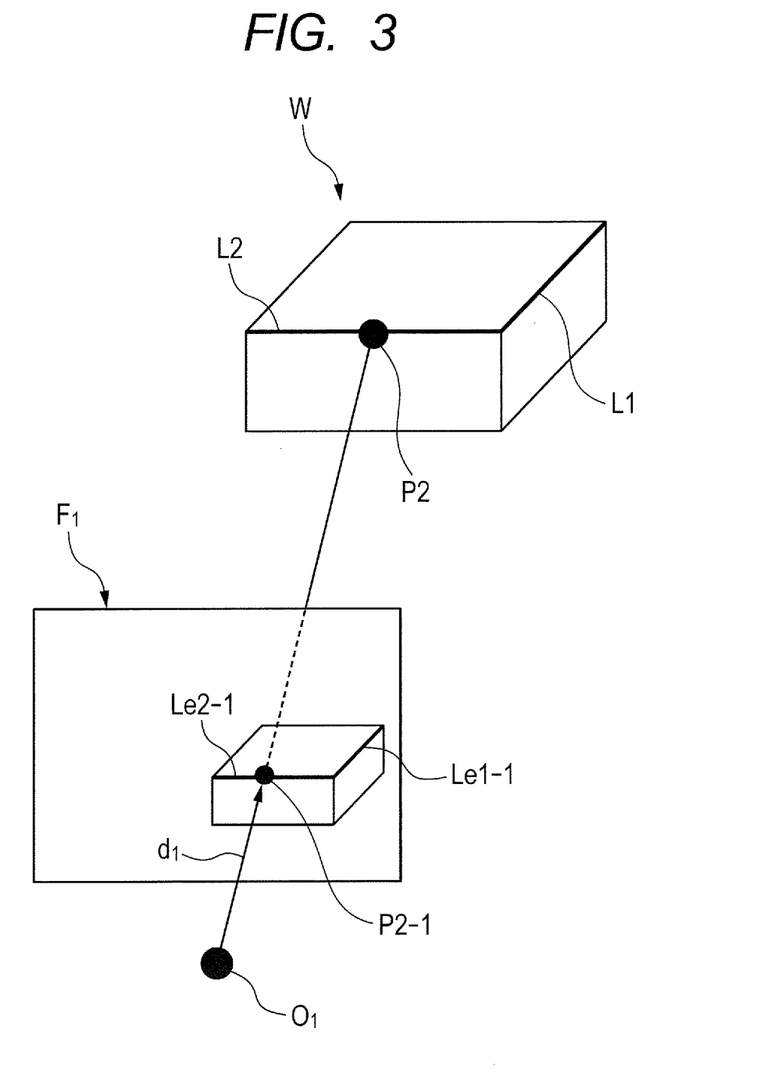
FIG. 3 is a pinhole camera model of the first camera of the three-dimensional measuring apparatus of FIG. 1.
Figure 4:
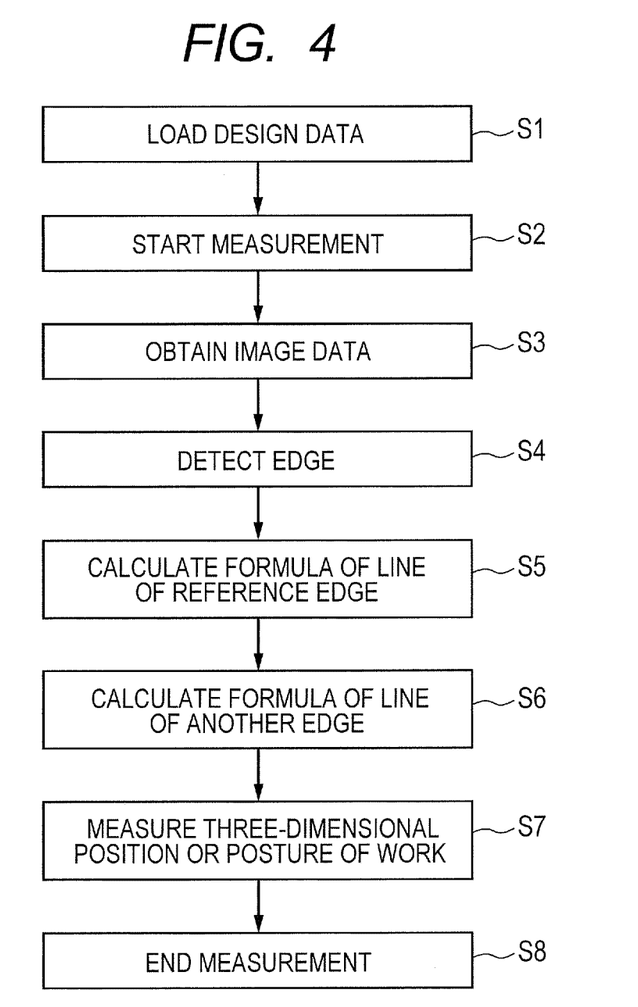
FIG. 4 is a flow chart of a three-dimensional measuring method according to the embodiment of the present invention.
Figure 5:
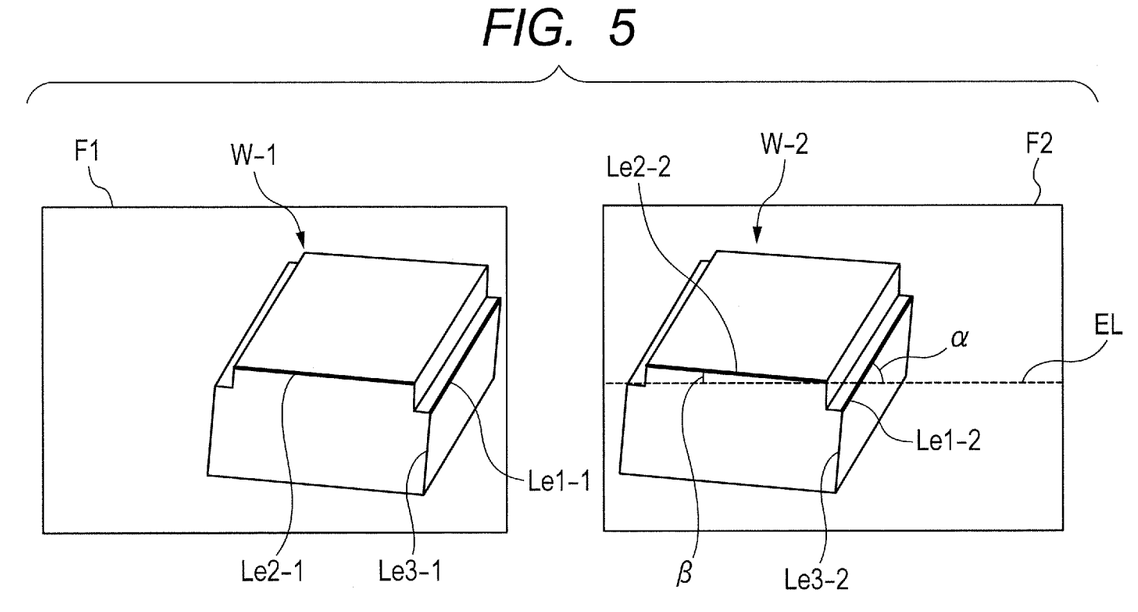
FIG. 5 is a schematic diagram illustrating images of a measurement object taken by the first and second cameras of the three-dimensional measuring apparatus of FIG. 1.

A pinhole camera model of the first camera C1 illustrated in FIG. 3 will be used to describe the second line section calculating step S6 in detail. P2 denotes a point on the second line section L2, $O_1$ denotes a coordinate origin of the first camera C1, F1 denotes an image plane of the first camera C1 (first image F1), and $d_1$ denotes a vector from the coordinate origin $O_1$ to an intersection point P2-1 of a line, which connects the coordinate origin $O_1$ and the point P2 on the second line section L2, and the first image F1. As for the camera coordinate system of the first camera C1, a perpendicular line from the coordinate origin $O_1$ to the first image F1 is a Z direction, and a plane parallel to the first image F1 is an XY plane.

Internal parameters A1 of the first camera C1 can be set as in the following Expression (2). In Expression (2), f denotes a focal length, k denotes an aspect ratio of pixels of a CCD (Charge Coupled Device), $(u_{01}, v_{01})$ denotes a principal point of projection, and the distortion is ignored.

$$A1 = \begin{bmatrix} f_1 \cdot k_{u1} & 0 & u_{01} \\ 0 & f_1 \cdot k_{v1} & v_{01} \\ 0 & 0 & 1 \end{bmatrix} \quad (2)$$

Assuming that the image coordinates of the point P2-1 on the second line section L2-1 of the first image is $(u_{1a1}, v_{1a1})$, the vector $d_1$ relative to the image coordinates can be expressed as in the following Expression (3).

$$\vec{d}_1 = \left( \frac{u_{1a1} - u_{01}}{k_{u1}} \quad \frac{v_{1a1} - v_{01}}{k_{v1}} \quad f_1 \right)^T \quad (3)$$

Similarly, assuming that the image coordinates of another point on the second line section L2-1 of the first image is $(u_{2a1}, v_{2a1})$, a vector $d_2$ relative to the image coordinates are expressed as in the following Expression (4).

$$\vec{d}_2 = \left( \frac{u_{2a1} - u_{01}}{k_{u1}} \quad \frac{v_{2a1} - v_{01}}{k_{v1}} \quad f_1 \right)^T \quad (4)$$

Based on these, it can be stated that the second line section L2 exists on a plane expressed by the following Expression (5) (k and l are parameters).

$$\begin{pmatrix} x \\ y \\ z \end{pmatrix} = k \cdot \vec{d}_1 + l \cdot \vec{d}_2 \quad (5)$$

Based on the geometric constraint condition obtained from the design data indicating that the first line section L1 and the second line section L2 intersect at right angle, it can be stated that the second line section L2 passes through the intersection point of the first line section L1 and the plane expressed by Expression (5) and is on a plane perpendicular to the first line section L1. Therefore, the second line calculating unit 112 calculates the formula of the three-dimensional line of the second line section L2, for a line of intersection of the plane perpendicular to the first line section L1 and the plane expressed by Expression (5).

As described, the first line section L1 obtained by calculating the formula of the three-dimensional line based on the stereo method can be set as a reference edge, and the geometric constraint condition for the reference edge can be used to calculate the formula of the three-dimensional line for the line section parallel to the epipolar line. As a result, the formula of the three-dimensional line can also be accurately calculated for the line section with the slope parallel to the epipolar line such as the second line section L2. Therefore, the choice of the line section that can be selected as the line section for calculating the formula of the three-dimensional line can be increased in the three-dimensional measurement of the measurement object. More specifically, an arbitrary edge can be calculated as the line section for calculating the formula of the line.

<Three-Dimensional Measuring Method in Detection of Relative Angle of Line Section with Respect to Epipolar Line>

A three-dimensional measuring method without setting in advance the line section for calculating the formula of the line will be described with reference to FIGS. 1, 4, and 5 to 7.

When the line section for calculating the formula of the line is not set in advance, the design data of the measurement object W is also input to the storing unit 130 (S1, data obtaining step), and the first camera C1 and the second camera C2 image the measurement object W (S2 and S3, imaging step).

When the first camera C1 and the second camera C2 image the measurement object, the line sections L1, L2, L3 . . . for detecting the formulas of the three-dimensional lines are detected from the obtained first and second images F1 and F2 (see FIG. 5) (S4, line section detecting step).

Figure 6:
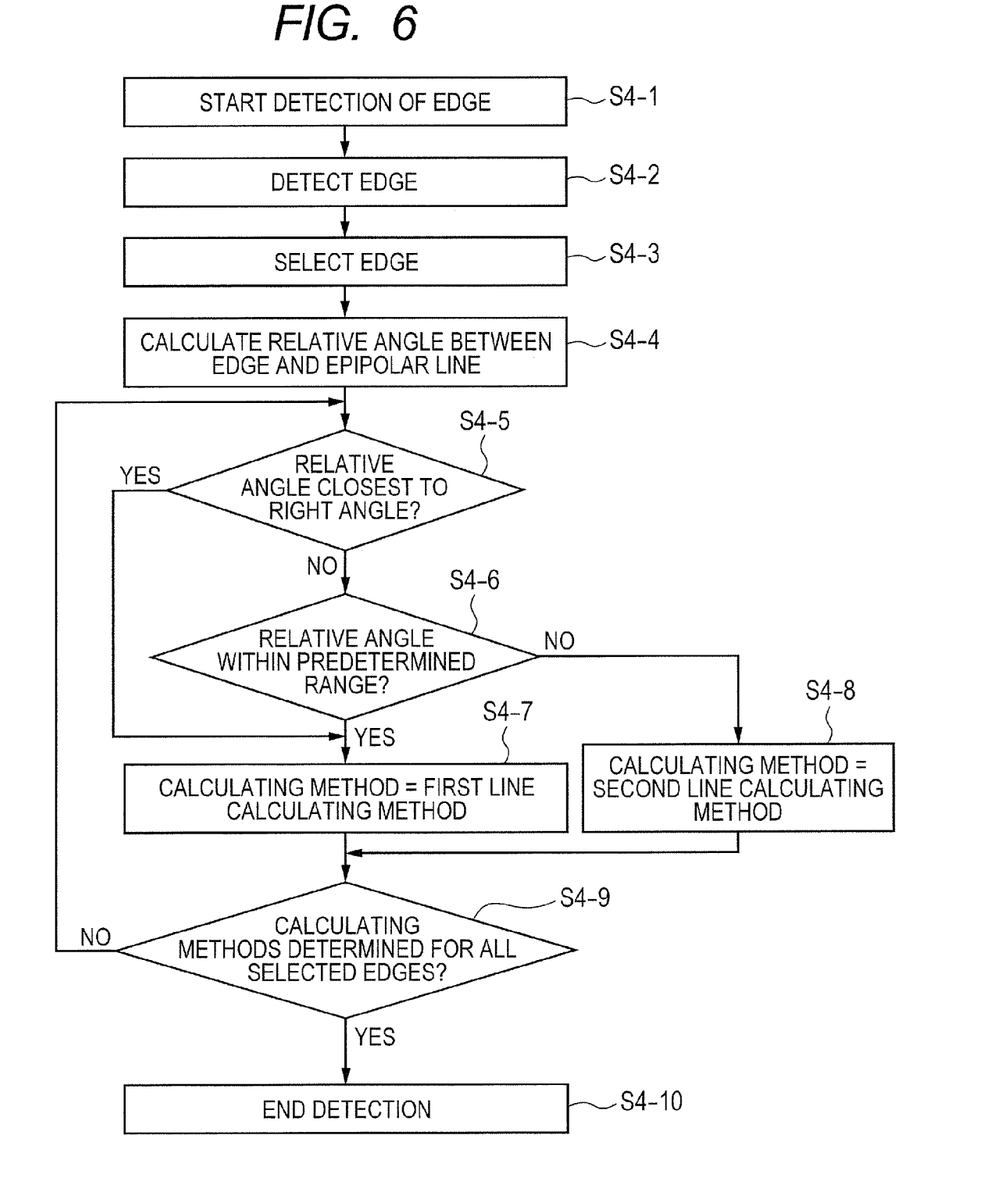
FIG. 6 is a sub flow chart of an edge detecting step when a line section is not designated.

As illustrated in FIG. 6, when the line section detecting step S4 is started (S4-1 of FIG. 7), the detecting unit 102 detects a plurality of line sections Le1-1, Le2-1, Le1-2, Le2-2 . . . from the images F1 and F2. More specifically, the line sections Le1-1, Le2-1, Le1-2, Le2-2 . . . detected on the images are associated, and the detected line sections Le1-1, Le2-1, Le1-2, Le2-2 . . . are associated with the design data (S4-2, detecting step).

When the line sections are detected and recognized from the image data, the line selecting unit 103 selects arbitrary line sections among the plurality of line sections Le as line sections for calculating the formulas of the three-dimensional lines (S4-3, line selecting step).

When the line sections Le1 and Le2 for calculating the formulas of the three-dimensional lines are selected, a relative angle calculating unit 105 calculates angles (hereinafter, "relative angles") α and β between an epipolar line EL of the second image F2 relative to the first image F1 and the line sections in the second image F2. The step is a relative angle calculating step (S4-4).

When the relative angles α and β are calculated for the line sections Le1 and Le2, the calculating method selecting unit 104 determines calculating methods of the formulas of the lines of the line sections (S4-5 to S4-9, calculating method setting step).

Specifically, the calculating method selecting unit 104 determines whether the relative angle of a line section is closest to the right angle (S4-5). If the line section is a line section (first line section Le1 in the present embodiment) where the relative angle α is closest to the right angle (Yes in S4-5), the stereo method is used to calculate the formula of the three-dimensional line (S4-7).

On the other hand, if the line section is not a line section where the relative angle is closest to the right angle (No in S4-5), the calculating method selecting unit 104 determines whether the relative angle is within a predetermined range θ1 to θ2 that can obtain enough accuracy for calculating the formula of the line using the stereo method (S4-6).

If the relative angle is within the predetermined range θ1 to θ2 (Yes in S4-6), the calculating method selecting unit 104 sets to use the stereo method to calculate the formula of the line of the line section (S4-7). If the relative angle is out of the predetermined range θ1 to θ2 (No in S4-6), the calculating method selecting unit 104 sets to use the design data to calculate the formula of the line of the line section (S4-8).

When the calculating methods of the formulas of the lines for all selected line sections are set (Yes in S4-9), the detection of the line sections is finished (S4-10).

When the line section detecting step S4 is finished, as illustrated in FIG. 4, the first line calculating unit 111 calculates the formula of the line of the line section (first line section L1 in the present embodiment) for which the stereo method is used to calculate the formula of the three-dimensional line (S5, first line section calculating step).

When the formula of the three-dimensional line of the first line calculating unit 111 is calculated, the second line calculating unit 112 calculates the formula of the three-dimensional line of the line section for which the design data is used to calculate the formula of the line (S6, second line section calculating step).

When the formulas of the three-dimensional lines of the first line section L1 and the second line section L2 are calculated, the measuring unit 120 uses the formulas of the three-dimensional lines of the first and second line sections L1 and L2 and the design data to measure the three-dimensional position or pose of the measurement object (S7, measuring step). The measurement is finished (S8).

Figure 7:
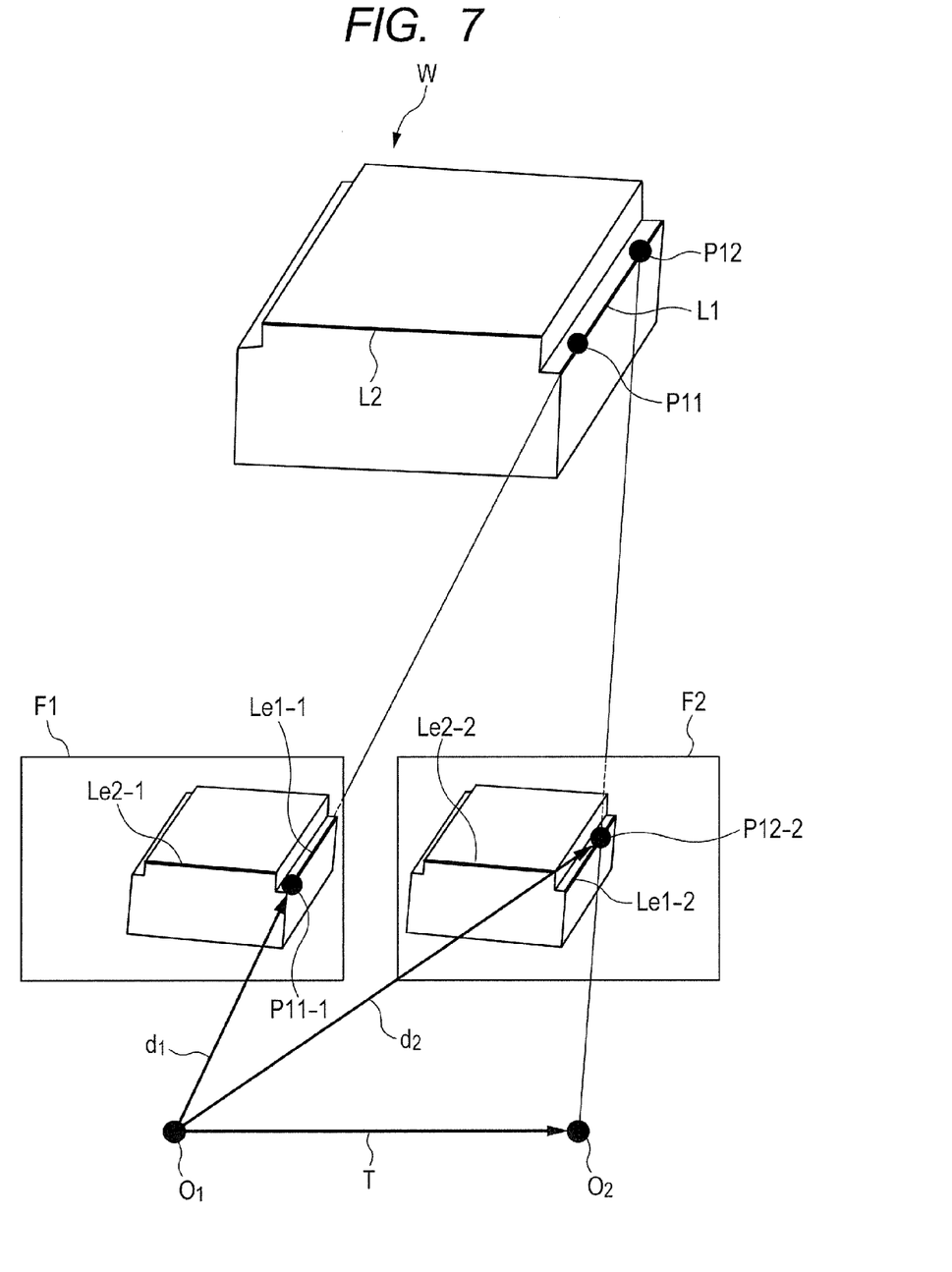
FIG. 7 is a schematic diagram illustrating a pinhole camera model of the first and second cameras of the three-dimensional measuring apparatus of FIG. 1.

The calculating methods of the formulas of the three-dimensional lines by the first line calculating unit 111 and the second line calculating unit 112 will be described in detail with reference to FIG. 7. FIG. 7 is a diagram illustrating the first and second cameras C1 and C2 by a pinhole camera model. P11 and P12 denote points on the first line section, and $O_1$ and $O_2$ denote coordinate origins of the first camera C1 and the second camera C2. A vector $d_1$ denotes a vector from the coordinate origin $O_1$ to an intersection point P11-1 of a line, which connects the coordinate origin $O_1$ and the point P11, and the first image (first image plane) F1. A vector $d_2$ denotes a vector from the coordinate origin $O_1$ to an intersection point P12-2 of a line, which connects the coordinate origin $O_2$ and the point P12, and the second image (second image plane) F2. A vector T denotes a vector from the coordinate origin $O_1$ to the coordinate origin $O_2$. As for the camera coordinate system of the first camera C1, a perpendicular line from the coordinate origin $O_1$ to the first image F1 is the Z direction, and a plane parallel to the first image is the XY plane. The measurement is performed in the camera coordinate system of the first camera C1.

An algorithm for the first line calculating unit 111 to calculate the formula of the three-dimensional line of the first line section L1 as the reference edge will be described.

Internal parameters of the first camera C1 are set as in Expression (2), and internal parameters of the second camera C2 are set as in the following Expression (6).

$$A2 = \begin{bmatrix} f_2 \cdot k_{u2} & 0 & u_{02} \\ 0 & f_2 \cdot k_{v2} & v_{02} \\ 0 & 0 & 1 \end{bmatrix} \quad (6)$$

Assuming that the image coordinates of the point P11-1 on the first line section Le1-1 of the first image F1 illustrated in FIG. 7 are $(u_{1bb1}, v_{1bb1})$, a vector d1 relative to the image coordinates is expressed as in the following Expression (7).

$$\vec{d}_1 = \left( \frac{u_{1bb1} - u_{01}}{k_{u1}} \quad \frac{v_{1bb1} - v_{01}}{k_{v1}} \quad f_1 \right)^T \quad (7)$$

Similarly, assuming that the image coordinates of another point on the first line section Le1-1 of the image F1 are $(U_{2bb1}, v_{2bb1})$, a vector $e_1$ relative to the image coordinates is expressed by the following Expression (8).

$$\vec{e}_1 = \left( \frac{u_{2bb1} - u_{01}}{k_{u1}} \quad \frac{v_{2bb1} - v_{01}}{k_{v1}} \quad f_1 \right)^T \quad (8)$$

As a result, the first line section L1 illustrated in FIG. 7 exists on a plane expressed by the following Expression (9).

$$\begin{pmatrix} x \\ y \\ z \end{pmatrix} = k_1 \cdot \vec{d}_1 + l_1 \cdot \vec{e}_1 \quad (9)$$

Assuming that the image coordinates of a point P12-2 on the first line section Le1-2 of the second image F2 are $(u_{1bb2}, v_{1bb2})$, the vector $d_2$ relative to the image coordinates is expressed as in the following Expression (10).

$$\vec{d}_2 = \left( \frac{u_{1bb2} - u_{02}}{k_{u1}} \quad \frac{v_{1bb2} - v_{02}}{k_{v2}} \quad f_2 \right)^T \quad (10)$$

Similarly, assuming that the image coordinates of another point on the first line section Le1-2 on the second image F2 is $(U_{2bb2}, v_{2bb2})$, a vector $e_2$ relative to the image coordinates are expressed as in the following Expression (11).

$$\vec{e}_2 = \left( \frac{u_{2bb2} - u_{02}}{k_{u2}} \quad \frac{v_{2bb2} - v_{02}}{k_{v2}} \quad f_2 \right)^T \quad (11)$$

As a result of using Expressions (10) and (11) and the vector T, the first line section L1 illustrated in FIG. 7 exists on a plane expressed by the following Expression (12).

$$\begin{pmatrix} x \\ y \\ z \end{pmatrix} = k_2 \cdot (\vec{T} + \vec{d}_2) + l_2 \cdot (\vec{T} + \vec{e}_2) \quad (12)$$

Therefore, the formula of the line of the first line section L1 can be calculated as a line of intersection of the plane expressed by Expression (9) and the plane expressed by Expression (12).

An algorithm for the second line calculating unit 112 to calculate the formula of the line of the second line section L2 illustrated in FIG. 7 will be described.

Assuming that the image coordinates of a point of the second line section Le2-1 of the first image F1 are $(u_{1aa1}, v_{1aa1})$, a vector $d_3$ relative to the image coordinates is expressed as in the following Expression (13).

$$\vec{d}_3 = \left( \frac{u_{1aa1} - u_{01}}{k_{u1}} \quad \frac{v_{1aa1} - v_{01}}{k_{v1}} \quad f_1 \right)^T \quad (13)$$

Similarly, assuming that the image coordinates of another point on the second line section Le2-1 is $(u_{2aa1}, v_{2aa1})$, a vector $e_3$ relative to the image coordinates is expressed as in the following Expression (14).

$$\vec{e}_3 = \left( \frac{u_{2aa1} - u_{01}}{k_{u1}} \quad \frac{v_{2aa1} - v_{01}}{k_{v1}} \quad f_1 \right)^T \quad (14)$$

As a result, the second line section Le2-1 illustrated in FIG. 7 exists on a plane expressed by the following Expression (15).

$$\begin{pmatrix} x \\ y \\ z \end{pmatrix} = k_3 \cdot \vec{d}_3 + l_3 \cdot \vec{e}_3 \quad (15)$$

Assuming that a directional vector of the first line section L1 calculated by the first line calculating unit 111 is vector $n_b$, the second line section L2 is on a plane where a normal vector is the vector $n_b$ based on the geometric constraint condition that the directional vectors of the second line section L2 and the first line section L1 intersect perpendicularly. Therefore, the plane can be expressed as in Expression (17) if the vector $n_b$ is set as in the following Expression (16).

$$\vec{n}_b = (n_{1b}, n_{2b}, n_{3b})^T \quad (16)$$

$$n_{1b}x + n_{2b}y + n_{3b}z + e = 0 \quad (17)$$

If the value of e in Expression (17) can be further obtained, the formula of the line of the second line section L2 can be calculated as a line of intersection of the planes expressed in Expressions (15) and (17).

It is assumed that the formula of the line of the first line section L1 calculated by the first line calculating unit 111 is Expression (18) and that the formula of the line of the second line section L2 obtained as the line of intersection of the planes expressed by Expressions (15) and (17) is Expression (19). In Expression (19), a vector g is a vector including e as a parameter.

$$\vec{x} = \vec{m} + s\vec{r} \quad (18)$$

$$\vec{x} = \vec{g} + t\vec{h} \quad (19)$$

For the two points on the lines at the shortest distance between the second line section L2 and the first line section L1, the following Expressions (20) and (21) are derived from Expressions (18) and (19) by assuming that the point on the second line section L2 is a vector p and that the point on the first line section L1 is a vector q.

$$\vec{p} = \vec{m} + s\vec{r} \quad (20)$$

$$\vec{q} = \vec{g} + t\vec{h} \quad (21)$$

If a vector w is defined as in the following Expression (22), the directional vector between the vector w and the second line section L2 and the directional vector between the vector w and the first line section L1 are orthogonal. Therefore, the following Expressions (23) and (24) are derived.

$$\vec{w} = \vec{q} - \vec{p} \quad (22)$$

$$\vec{r} \cdot \vec{w} = 0 \quad (23)$$

$$\vec{h} \cdot \vec{w} = 0 \quad (24)$$

Solving Expressions (23) and (24) can obtain s and t in Expressions (20) and (21). The formula of the line of the second line section L2 illustrated in FIG. 7 can be calculated by using the obtained s and t and taking into account the geometric constraint condition expressed by Expression (25).

$$|\vec{w}| = L \quad (25)$$

If the solution is not uniquely determined by the geometric constraint conditions, another geometric constraint such as a relative positional relationship between the lines may be added, or approximate area information of the measurement target of the image may be used. An existing position range and an existing pose range of the measurement target that are known in advance can be used to uniquely determine the solution.

As described, even if the line section for calculating the formula of the line is not set in advance, the relative angle with respect to the epipolar line EP can be obtained to arbitrarily set the calculating method of the selected line section. For the line section with the slope parallel to the epipolar line such as the second line section L2, the geometric constraint condition relative to the reference edge can be used to accurately calculate the formula of the three-dimensional line. Therefore, the choice of the line sections that can be selected as the line section for calculating the formula of the three-dimensional line can be increased in the three-dimensional measurement of the measurement object.

The stereo method is used to calculate the formula of the three-dimensional line for the line section with the relative angle closest to the right angle. Therefore, one or more reference edges can always be obtained, and the line section that allows accurate calculation of the formula of the line can be set as the reference edge.

If the relative angle is within the predetermined range in the line section detecting step S4, an algorithm for calculating the formula of the line by the stereo method is included, instead of using the geometric constraint condition for the reference edge to calculate the formula of the three-dimensional line. Therefore, the formula of the line can be calculated by the stereo method as much as possible, and the computation for calculating the three-dimensional line of the line section can be simplified. Examples of the algorithm of the calculating method selecting step include S4-5, S4-6, S4-7, and S4-9.

As described, according to the present invention, the geometric constraint condition for the first line section L1, for which the formula of the three-dimensional line is calculated by the stereo method, can be used to calculate the formula of the three-dimensional line of the second line section L2. Therefore, even in a three-dimensional measuring apparatus with only two cameras, the number of line sections that can be selected as the line sections for calculating the formulas of the three-dimensional lines for the measurement of the measurement object can be increased without increasing the number of cameras.

The relative angle with the epipolar line EL is closer to the right angle in the line section (for example, first line section) as the reference edge than in the line section for which the formula of the line is calculated using the geometric constraint condition for the reference edge. Therefore, the calculation accuracy of the formula of the line can be improved. As a result, the measurement accuracy of the pose and the three-dimensional position of the measurement object can also be improved.

An angle formed by the reference edge (first line section) and a directional vector in the middle or a shortest distance can be set as the geometric constraint condition. Therefore, the geometric constraint conditions can be easily obtained from the design data.

Although two cameras image the measurement object in the present embodiment, more than two cameras may image the measurement object. In this case, the formula of the three-dimensional line can be accurately calculated for a line section with a small relative angle in a selected image. The arrangement between the camera and the measurement object W may be any arrangement in practice as long as the camera parameters and the relative position are calibrated.

In the calculation of the formula of the line, the geometric constraint condition may be used from the design data to calculate the formula of the line for the line section with the relative angle closest to parallel.

In the line section detecting step S4, the calculating methods of the formulas of the lines may be set based on whether all of the selected line sections are within a predetermined range of the relative angle. If all line sections are out of the range, the formula of the three-dimensional line with the relative angle closer to the right angle between the compared line sections can be calculated using the stereo method.

Although only two line sections for calculating the formulas of the three-dimensional line are calculated in the present embodiment, the formulas of the lines may be calculated for three or more line sections.

The geometric constraint condition is a condition derived from a geometric relationship between two or more line sections of the measurement target. The geometric constraint condition used in the present embodiment is a condition that the angle formed by the first line section L1 and the second line section L2 is a right angle or that the shortest distance between two lines, i.e. the length of a line perpendicular to the two lines, is L. However, any condition may be set as long as the geometric constraint condition can be recognized from the design data. A plurality of geometric conditions, such as the angle formed by the line sections and the shortest distance between the two lines, may be combined and used.

The actual configuration of the cameras may be any configuration as long as the measurement target can be imaged. Although the skew is not taken into account in the internal parameters, the skew may be taken into account in practice.

Although the straight edge is recognized as the line section in the present embodiment, the line section does not have to be the edge. For example, the line section may be a known straight pattern of the measurement object based on the design data, as long as a line can be recognized between arbitrary two points on the image. The inventions described in the present embodiment may be combined in any way.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-160959, filed Jul. 22, 2011, which is hereby incorporated by reference herein in its entirety.

What is claimed is:

1. A three-dimensional measuring method comprising the steps of:
   obtaining design data of a measurement object;
   obtaining a first image of the measurement object taken by a first camera and a second image of the measurement object taken by a second camera from a viewpoint different from the first image;
   detecting a plurality of line sections of the measurement object from the first and second images and selecting at least a first line section and a second line section from the plurality of line sections;
   using a stereo method to calculate a formula of a three-dimensional line of the first line section;
   using the formula of the three-dimensional line of the first line section and a geometric constraint condition for the first line section obtained from the design data of the measurement object to calculate a formula of a three-dimensional line of the second line section; and
   using the formulas of the three-dimensional lines of the first and second line sections to measure a three-dimensional position or pose of the measurement object.

2. The three-dimensional measuring method according to claim 1, wherein
   the first line section is selected so that a relative angle of the first line section with respect to an epipolar line of the second image corresponding to a point on a line section of the first image is closer to a right angle than a relative angle of the second line section with respect to the epipolar line.

3. The three-dimensional measuring method according to claim 2, wherein
   if the relative angle of the second line section with respect to the epipolar line is within a predetermined range, the formula of the three-dimensional line is calculated by the stereo method, instead of using the geometric constraint condition for the first line section to calculate the formula of the three-dimensional line.

4. The three-dimensional measuring method according to claim 1, wherein
   the geometric constraint condition is an angle formed by directional vectors of the first line section and the second line section and/or a shortest distance between the first line section and the second line section.

* * * * *